Nov. 3, 1931.  B. F. STOWELL  1,830,179
CUTTING TOOL
Filed April 21, 1928

INVENTOR.
Byron F. Stowell
BY Chapin & Neal
ATTORNEYS.

Patented Nov. 3, 1931

1,830,179

UNITED STATES PATENT OFFICE

BYRON F. STOWELL, OF HAMPDEN, MASSACHUSETTS, ASSIGNOR TO VAN NORMAN MACHINE TOOL COMPANY, OF SPRINGFIELD, MASSACHUSETTS, A CORPORATION OF MASSACHUSETTS

CUTTING TOOL

Application filed April 21, 1928. Serial No. 271,870.

This invention relates to cutting tools and will be described with particular reference to tools intended for resurfacing the carbon-coated and pitted valve seats of internal combustion engines. It has for its objects the improvement of tools of this type in respect to their cutting ability, their cheapness, and their wearing qualities. The manner in which these objects are attained will appear from the following description and claim.

Referring to the drawings.

While the invention may be applied to other types of tool, it will be described in an embodiment intended for resurfacing the conical valve seats of internal combustion engines. When such valve seats have become incrusted with carbon and pitted they must be scraped clean before they can be surfaced to the degree of accuracy and finish required. Due to the great hardness of the carbon coating, this has previously been a matter of great difficulty, as the tools used would become dull rapidly and require frequent regrinding. These tools have generally been made of high quality steel suitably formed with cutting surfaces.

According to my invention, I form the body of the cutter of an inexpensive material such as cast iron, and insert in this body teeth of high quality, preferably hardened only adjacent their cutting edges. The relatively soft portions of the blades cushion the cutting action, and allow the blades to drag along the surface to be cleaned with an action much like a series of scrapers. The cushioning also greatly reduces the chipping and breaking down of the cutting surfaces. The concentration of the high quality material into the blades, which require little shaping, reduces the cost of the main bulk of the tool so that for a given price a much higher quality steel can be used for the cutting elements.

Figure 1:
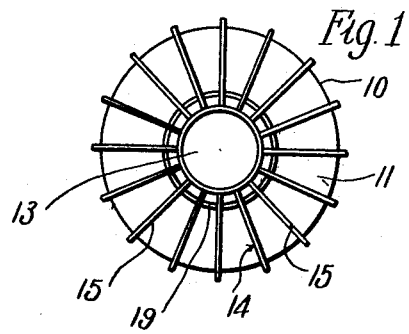
Fig. 1 is a plan view of a cutter embodying my invention.
Figure 2:
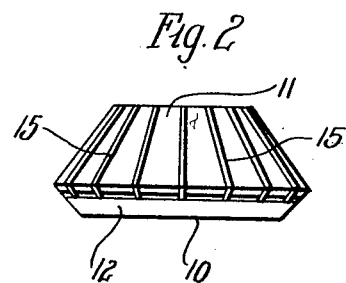
Fig. 2 is a side elevation thereof.
Figure 3:
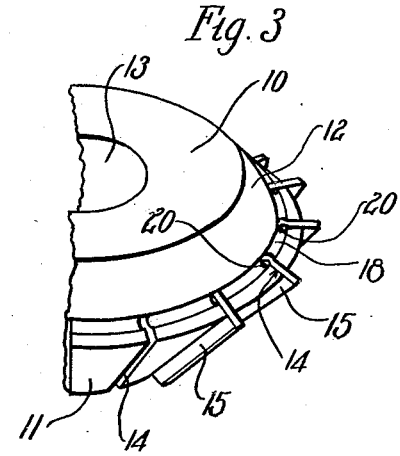
Fig. 3 is a partial perspective view showing the manner in which the blades are secured in the body portion of the cutter.

The form of the invention shown in Figs. 1, 2 and 3 will first be considered. The tool there shown comprises a body portion 10, preferably of cast iron or other relatively inexpensive material, having a conical surface 11 and a reversely tapered surface 12. A bore 13 extending axially through the body 10 may be tapered or otherwise formed for fitting upon a standard tool operating device. Slots 14, here shown as all directed towards the apex of the conical surface although they may be arranged in a slanting direction if desired, are formed in the surface 11.

The blades 15 are formed from a strip of high quality steel, preferably of an alloy steel, hardened as indicated at 16 adjacent one edge only, the remainder of the width of the strip being relatively soft and flexible. Grooves 18 and 19 are provided on the surface 12 and on the other end of the body portion respectively, into which the slots 14 extend. After the blades have been inserted in the slots 14, their end portions are distorted into the grooves 18 and 19 as by a prick punch or by peening. This permanently secured the blades in place and they may now be ground true, when the cutter is ready for use.

Figure 4:
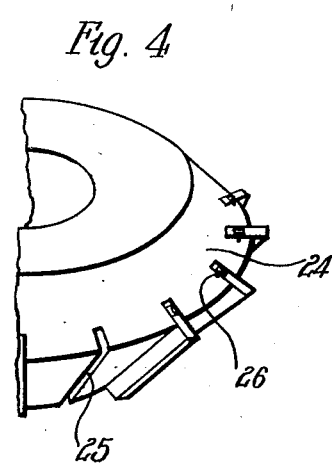
Fig. 4 is a similar view showing a modified manner of securing the blades.
Figure 5:
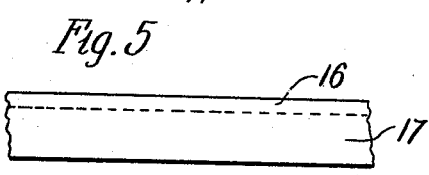
Figs. 5 and 6 are details respectively of the blade stock and of a blade used in the form of Fig. 3.
Figure 6:
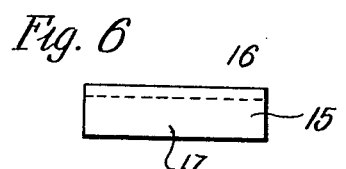
Figure 8:
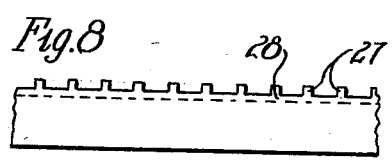
Fig. 8 is a detail of a modified form of blade stock.
Figure 7:
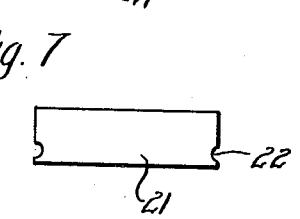
Fig. 7 is a detail of a blade for the modification of Fig. 4.

In Figs. 4 and 7, I have shown an alternative way of securing the blades in place which is particularly useful in cases where the blade is hardened throughout its width and therefore cannot be distorted into grooves in the base as in the case just described. In this modified form, the blades are notched as at 22 at their ends, and when they are inserted into the slots 14 in the body 24 (here made without the end grooves), the body of the tool is distorted, by prick punch marks, peening or otherwise, into the notches 22.

It may be desired in some instances to give a rough tooling to the valve seat before smoothing it up in order to remove heavy carbon deposits. In this case, teeth 27 may be formed in the hardened side 28 of the blade strip. In assembling these toothed blades into the tool body, teeth of adjacent blades are preferably offset in order to avoid grooving the valve surface. A convenient way of doing this is to provide a fixture which will engage the teeth of the blades and hold them positively in a spiral or other desired relation until they are secured permanently.

What I claim is:

A valve seat cutting tool having a body portion in the form of a truncated cone, slotted in the conical walls thereof, a plurality of blades tightly fitting into said slots and extending outwardly therefrom, each blade having a hardened cutting portion adjacent its outer edge with that part enclosed in the slot and a part of the outwardly projecting portion relatively resilient, and grooves in the body portion adjacent the ends of the blades, the blade ends having relatively soft portions offset into said grooves to hold the blades against displacement.

In testimony whereof I have affixed my signature.

BYRON F. STOWELL.